United States Patent [19]

Licht

[11] Patent Number: 5,139,132

[45] Date of Patent: Aug. 18, 1992

[54] ORIENTATION APPARATUS AND METHOD FOR DISK SHAPED PARTS

[75] Inventor: Thomas A. Licht, Boulder, Colo.

[73] Assignee: Ball Corporation, Muncie, Ind.

[21] Appl. No.: 756,676

[22] Filed: Sep. 9, 1991

[51] Int. Cl.⁵ .............................................. B65G 47/24
[52] U.S. Cl. .................................... 198/376; 198/395
[58] Field of Search ................. 198/394, 395, 375, 376

[56] References Cited

U.S. PATENT DOCUMENTS

| | | |
|---|---|---|
| 2,968,387 | 1/1961 | Lagler . |
| 3,297,134 | 1/1967 | Pastuszak . |
| 3,451,523 | 6/1969 | Evans, Jr. et al. ............... 198/394 |
| 3,628,650 | 12/1971 | Rouse . |
| 3,690,487 | 9/1972 | Evans, Jr. et al. ............... 198/394 |
| 4,016,968 | 4/1977 | Stelter ............................ 198/394 |
| 4,261,680 | 4/1981 | Carnley et al. ............... 198/376 X |
| 4,428,474 | 1/1984 | Gau et al. ....................... 198/394 |
| 4,497,409 | 2/1985 | Chong .......................... 198/394 X |
| 4,721,199 | 1/1988 | Ioannides . |
| 4,752,898 | 6/1988 | Koenig ......................... 198/394 X |
| 4,776,447 | 10/1988 | Pitcher . |
| 4,954,044 | 9/1990 | Chizaki ........................ 198/394 X |

FOREIGN PATENT DOCUMENTS 2499032 8/1982 France .................. 198/395

0221020 9/1990 Japan ........................... 198/394

Primary Examiner—D. Glenn Dayoan
Attorney, Agent, or Firm—Gilbert E. Alberding

[57] ABSTRACT

A high speed orientation apparatus for disk-shaped objects includes upper and lower turntables operated to provide constant angular orientation of the disk-shaped objects. An automatic supply delivers disk-shaped objects to one of a plurality of disk receiving stations located on the upper turntable. The upper turntable and the lower turntable, which also includes disk receiving stations, are attached to a rotating drive with the disk receiving stations of the lower table directly underneath the disk receiving stations of the upper table. Both the upper and lower turntables are rotated at the same speed. The plurality of disk receiving stations include operable disk retainers for holding and releasing a disk-shaped object. An inspection and control device adjacent to the upper turntable determines by inspection the angular orientation of each of the disk-shaped objects and controls each of the operable disk retainers so that the disks-shaped objects are rotated to a predetermined angular orientation by the upper turntable and transferred to the lower turntable. The disk receiving stations of the lower turntable are maintained at a constant angular orientation.

32 Claims, 6 Drawing Sheets

5,139,132

ORIENTATION APPARATUS AND METHOD FOR DISK SHAPED PARTS

FIELD OF THE INVENTION

This invention relates to an apparatus and method for high speed orientation of disk-shaped objects having a discernible angular orientation, and more particularly relates to an apparatus and method for providing a flow of can ends having their metal grain structures aligned at the same angular orientation.

BACKGROUND OF THE INVENTION

It is known in the art that the strength of a beverage can end may be increased if a scored pour opening is oriented properly with respect to the direction of the metal texture, i.e., grain structure. Prior to this invention, efforts to orient disk-shaped parts have focused primarily on intentionally providing non-functional physical deformations to identify the orientation of the metal grain texture of a can end or to locate an area of the can end for subsequent manufacturing processes.

U.S. Pat. No. 4,016,968 to Stelter rotates a can end with a reciprocating mandrel until a preformed tab in the can end engages a sensor lug. When the sensor lug is engaged, a clutch slips and the oriented part is then transported from the orientation mandrel.

U.S. Pat. No. 3,628,650 to Rouse discloses another means of mechanically orienting a can end using a plurality of rotating wheels. Can ends having preformed embossments are individually rotated until the embossments align with similarly shaped rollers located underneath the can end and gravitational force causes the can end to seat on the similarly shaped rollers, thereby pulling the can end away from the other plurality of driving rotating wheels. The can end may then be removed from the apparatus in an oriented position.

U.S. Pat. Nos. 2,968,387 and 3,297,134 to Lagler and Pastuszak respectively rotate disk-shaped objects and utilize preformed physical shapes of the disks to achieve a common orientation.

U.S. Pat. Nos. 4,776,447 and 4,721,199 to Pitcher and Ioannides respectively disclose devices for orienting can ends using outwardly extending members which are inserted into preformed cut-outs in the can ends. The outwardly extending members are moved in a predetermined path so that the can ends are thereby oriented.

All of these prior methods have the disadvantage of using some preformed physical shape or deformation in each of the disk-shaped objects to mechanically determine the angular orientation.

It is also known in the art to use scanning equipment to inspect cans or can ends for quality imperfections of various kinds. For example, U.S. Pat. No. 4,497,409 to Chong describes a seam inspection apparatus in which an electronic scanner is used to inspect the seams of a can to determine whether certain quality standards are complied with.

DISCLOSURE OF THE INVENTION

This invention provides means for high speed orientation of disk-shaped objects which does not require preformed physical deformations in the disk-shaped objects and utilizes a non-mechanical detection means to determine the angular orientation of each of the disk-shaped objects prior to establishing a common orientation. Angular orientation means the direction along which some discernible feature of disk-shaped object lies, such as the direction of the metal grain structure with respect to a constant direction of the environment, such as the direction of the next apparatus or North, etc.

An automatic supply means at an input location supplies disk-shaped objects to one of a plurality of disk receiving stations located on an upper turntable. Each of the disk receiving stations includes an operable disk retention means for holding a disk-shaped object and releasing the disk-shaped object at a varying location to be determined. A lower turntable has similar disk receiving stations and operable disk retention means and is attached in parallel with the upper turntable so that the disk receiving stations of the lower table are directly underneath the disk receiving stations of the upper table. Both the upper and lower turntables are rotated at the same speed by a rotating means.

An inspection and control device disposed adjacent to the upper turntable inspects each of the disk like objects to determine the individual angular orientation of each of the disk-shaped objects and controls each of the operable disk retention means of the upper turntable so that the disk-shaped objects are rotated to a predetermined angular orientation by the upper turntable and released from the operable disk retention means of the upper turntable onto the associated disk receiving stations of the lower turntable. The disk receiving stations of the lower turntable counter-rotate with respect to the direction of rotation of the lower turntable to maintain a constant angular orientation of the disk-shaped objects as the lower turntable rotates and the disk retention means of the lower turntable are operated to remove each of the oriented disks from the orientation apparatus in a predetermined common angular orientation at an output location.

The orientation apparatus of this invention can form an important part of an apparatus and method for providing a flow of can ends having their metal grain structures aligned at the same angular orientation with respect to the direction of flow of the can ends from the orientation apparatus for further manufacturing processing upstream.

BEST MODE FOR CARRYING OUT THE INVENTION

Figure 1:
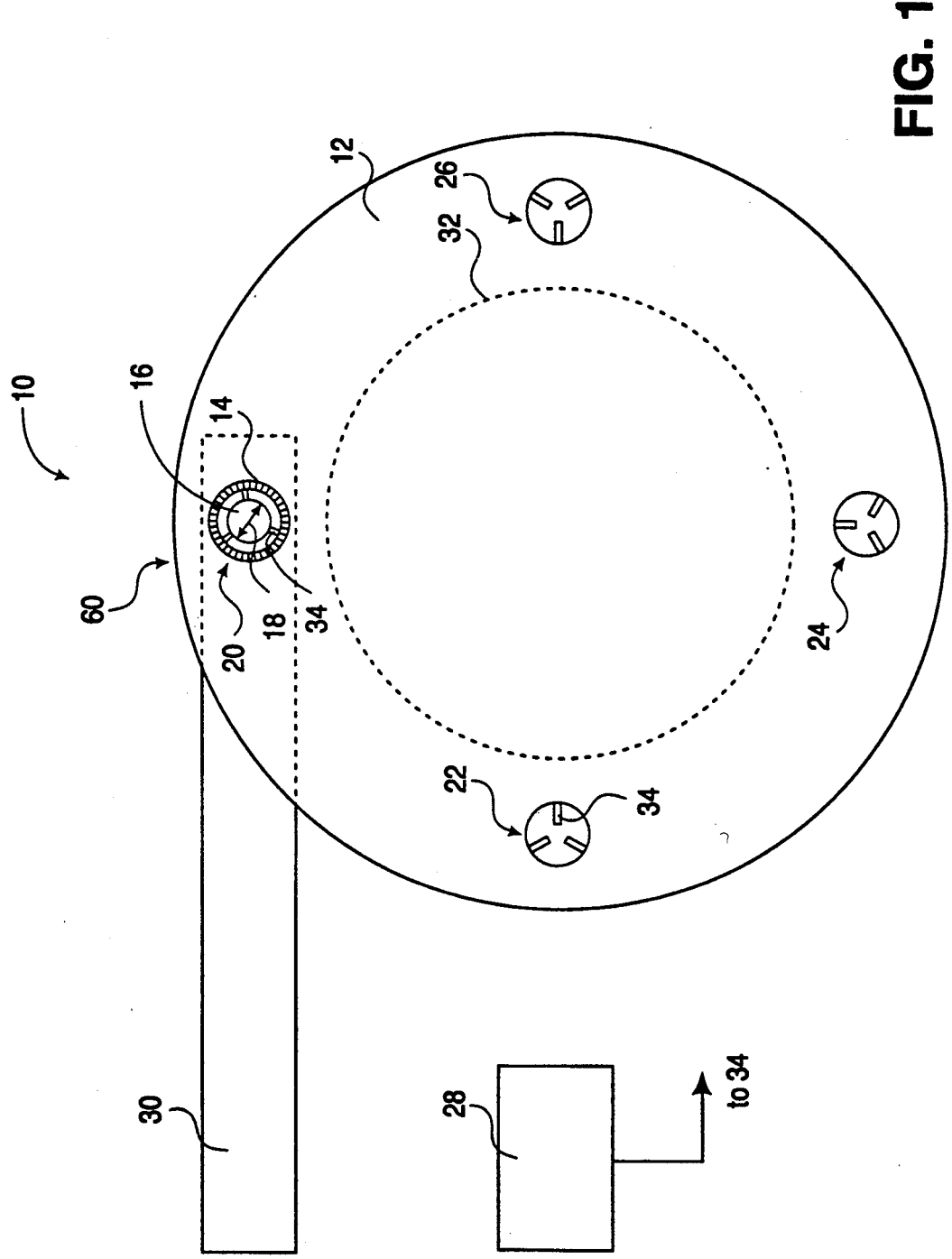
FIG. 1 is a top view of the apparatus.

FIG. 1 depicts an upper turntable 12 including one or more disk receiving stations, such as the four stations 20, 22, 24 and 26, adapted to receive disk-shaped objects 16 from an automatic supply means 14. The automatic supply means 14 could comprise, for example, a stack loader or a conveyor. The disk-shaped objects 16 include some discernible feature, such as metal grain texture or surface markings, allowing detection of the angular orientation of each of the disk-shaped objects. In a preferred embodiment of this invention, the disk-shaped objects 16 are can ends with a detectable metal grain texture shown by arrows 18 providing an indication of the angular orientation of each of the can ends. In other applications, the angular orientation could be determined from other detectable physical phenomenon such as a notch, groove, indentation, surface marking, etc.

Figure 2:
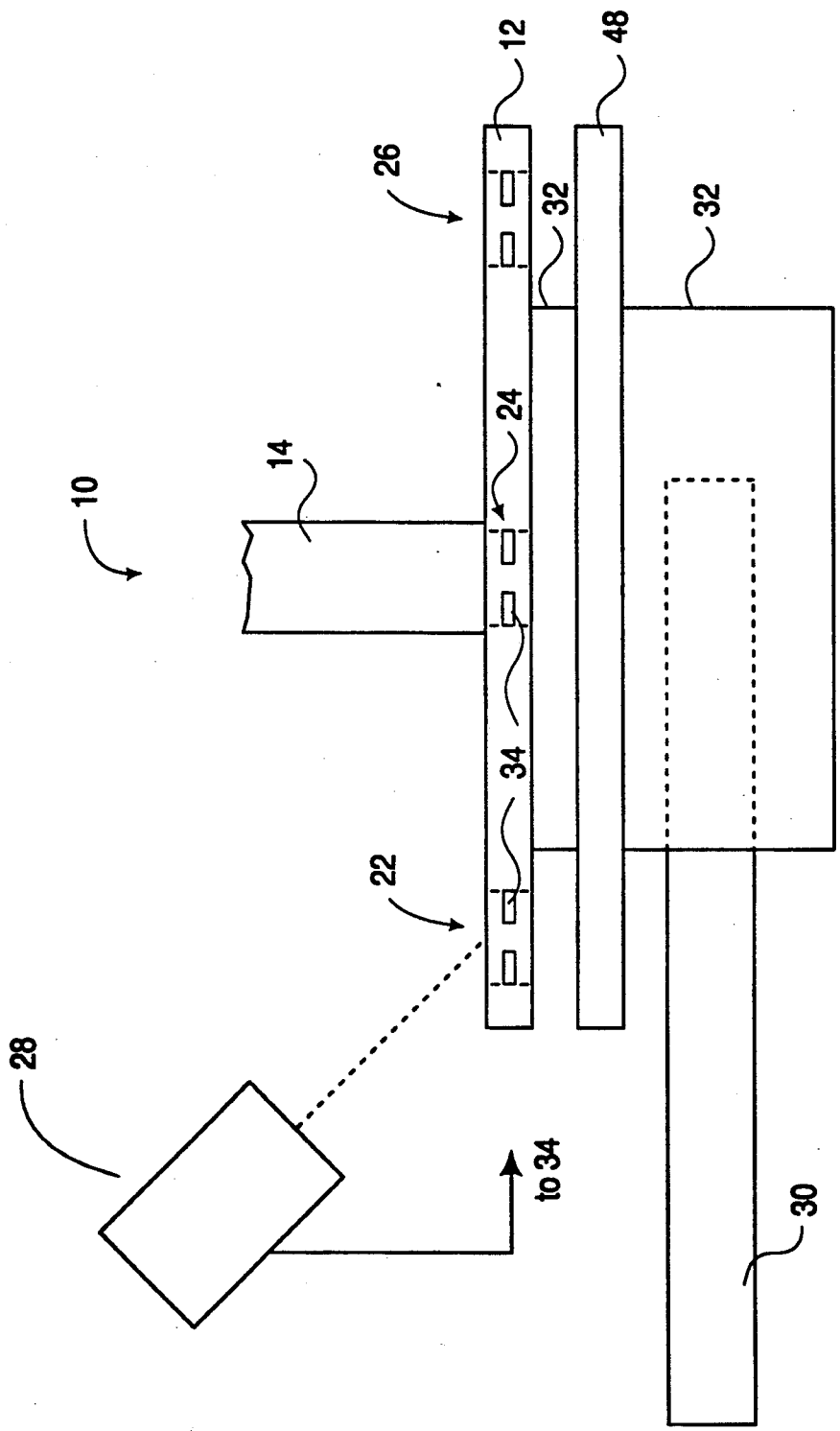
FIG. 2 is a side view of the apparatus.
Figure 3:
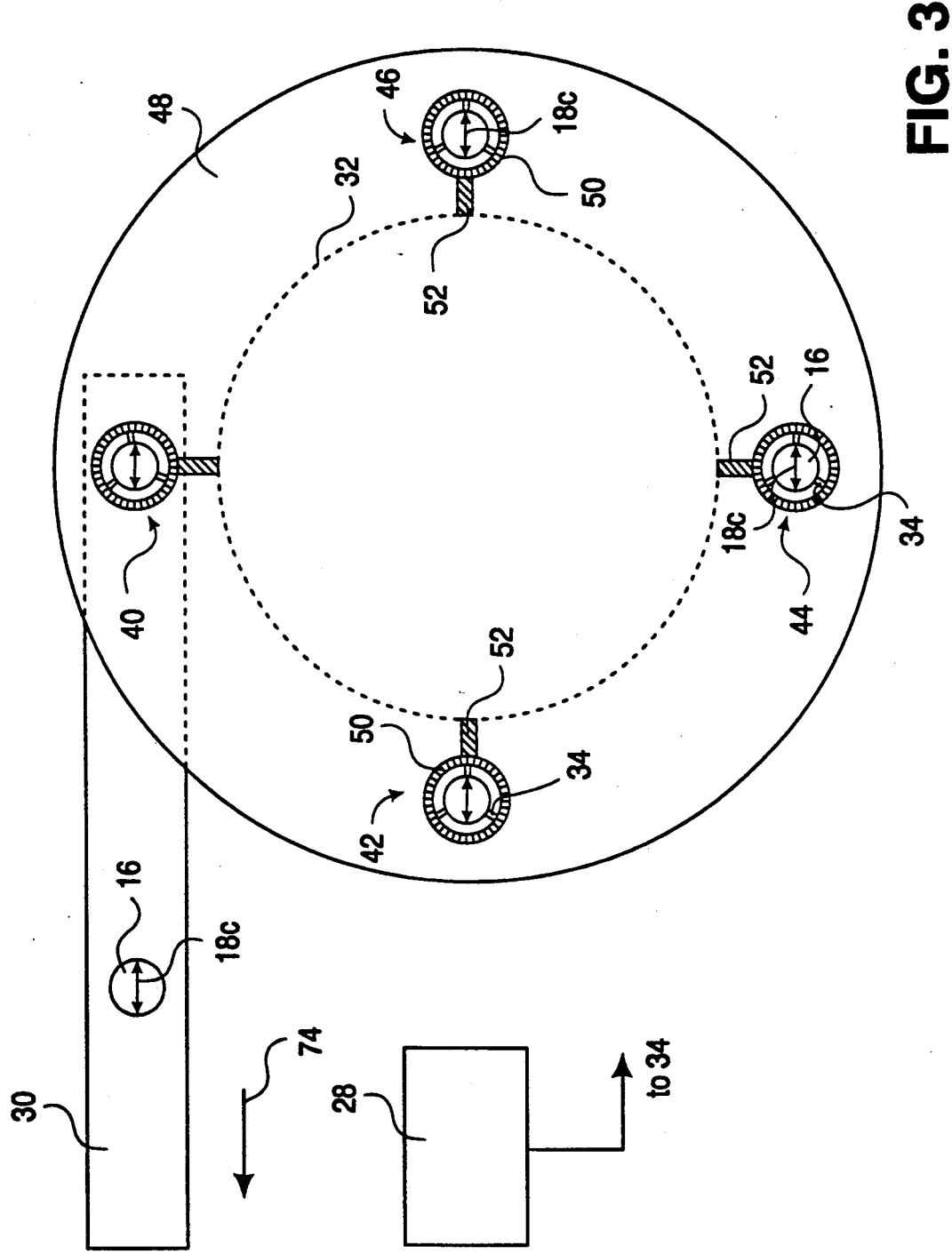
FIG. 3 is a top view of the apparatus with the upper turntable and supply means removed.

In the embodiment shown in FIGS. 1-3, the upper and lower turntables 12 and 48 each have four disk receiving stations, 20, 22, 24, 26 and 40, 42, 44 and 46 respectively. In other embodiments, not shown, the upper and lower turntables could each have a different number of disk receiving stations, e.g., one, two, three or six per turntable.

Each of the disk receiving stations 20, 22, 24 and 26 is rigidly formed in or fastened to the upper turntable 12 and includes operable disk retention means 34 adapted to retain the disk-shaped objects when in an extended position and to allow the disks to fall freely when in a retracted position, for example, from the upper turntable 12 to the lower turntable 48. In a preferred embodiment of the invention, the operable disk retention means 34 of upper turntable 12 comprises three solenoid-operated disk holders capable of simultaneous rapid extension and retraction which are equidistantly spaced around the circumference of each of the disk receiving stations 20, 22, 24 and 26 of the upper turntable. In other embodiments of the invention, operable disk retention means 34 could have a different number of disk holders, e.g., 4 or 5, and could be operated by other than electrical means, e.g., pneumatically operated.

An inspection and control means 28 is disposed above and adjacent to the upper turntable 12 for inspecting and determining the angular orientation of each of the disk-shaped objects 16. The inspection and control means 28 further acts to operate the plurality of disk retention means 34 via any conventional means, such as an electrical connection to an electromechanical slip ring if solenoid-operated disk holders are used, or air lines if pneumatically operated disk holders are used.

The lower turntable 48 includes four disk receiving stations 40, 42, 44 and 46 which are located below their associated disk receiving stations 20, 22, 24 and 26 respectively, in the upper turntable. Stations 40, 42, 44 and 46 are adapted to receive disk-shaped objects 16 from the upper turntable 12 upon retraction of the disk retention means 34 of the upper turntable. Each of the disk receiving stations 40, 42, 44 and 46 are rotatably carried by said lower turntable and are driven by counter-rotational drive means 50 to counter-rotate with respect to the lower turntable at the same rotational speed as the lower turntable, thereby maintaining each of the disk receiving stations 40, 42, 44 and 46 non-rotational (i.e., at a constant angular orientation) with respect to the surrounding environment and output means 30.

Disk receiving stations 40, 42, 44 and 46 each include an operable disk retention means 34 adapted to retain the disk-shaped objects when in an extended position and to allow the disks to fall freely to an output means 30 when in a retracted position. In a preferred embodiment of the invention, shown in FIG. 3, the operable disk retention means 34 of lower turntable 42 comprises three solenoid-operated disk holders capable of simulta-neous rapid extension and retraction which are equidistantly spaced around the circumference of each of the disk receiving stations 40, 42, 44 and 46 of the lower turntable. In other embodiments of the invention, operable disk retention means 34 could have a different number of disk holders, e.g., 4 or 5, and could be operated by other than electrical means, e.g., pneumatically operated.

An output means 30 receives disk-shaped objects 16 released from the plurality of disk receiving stations 40, 42, 44 and 46 by the disk retention means 34 and carries the oriented disk-shaped objects away from the orientation apparatus.

As an example of a presently known best mode of operation, the disk orientation apparatus 10 of this invention is used to orient can ends at a predetermined angular orientation. As shown in FIGS. 1 and 2, a stack loader 14 supplies a stack of can ends to be inspected to an upper turntable 12 at an input location 60 (FIG. 1) corresponding to the position of disk receiving station 20. The upper and lower turntables rotate at the same rotational speed and the disk receiving stations 40, 42, 44 and 46 of lower turntable 48 are directly below the disk receiving stations 20, 22, 24 and 26 of upper turntable 12 at all times. Although disk receiving stations 20, 22, 24, 26 and 40, 42, 44, 46 are shown stationary in FIGS. 1-3, each of the disk receiving stations 20, 22, 24 and 26 and 40, 42, 44 and 46 are carried through 360° as the turntables 12 and 48 are rotated and inspection and orientation actually occurs "on the fly."

Each of the can ends 16 have a metal grain texture, i.e., detectable grain structure, allowing detection of the angular orientation of each of the can ends. In other embodiments, not shown, the angular orientation could be determined from the orientation of one or more markings or pre-formed physical deformations contained in the can end.

Figure 4:
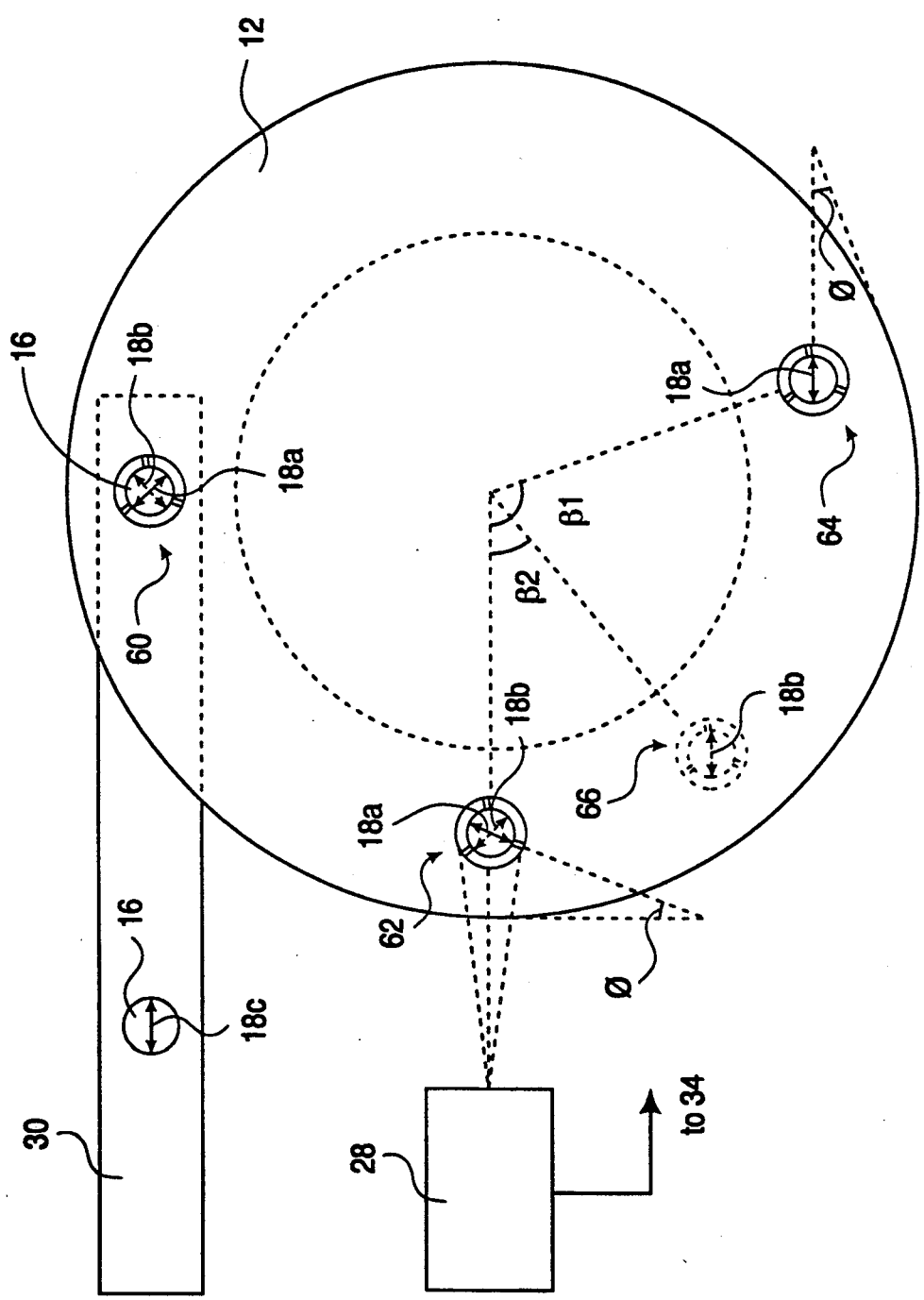
FIG. 4 is a top view of the apparatus illustrating operation of the disk receiving stations on the upper turntable during the orientation method of this invention.

FIG. 4 illustrates various positions 60, 62, 64 and 66 on upper turntable 12 through which each of the disk receiving stations 20, 22, 24 and 26 will pass in the operation of the apparatus 10 as the method of this invention is carried out. These locations are referred to as an input location 60, an inspection location 62 and exemplary transfer locations 64 and 66.

A can end 16 is received from an automatic supply means 14 at input location 60 by one of the disk receiving stations 20, 22, 24 and 26 on upper turntable 12. The randomly varying angular orientation of each can end 16 received at input location 60 is indicated as metal grain textures 18a and 18b. Only two of the infinite angular orientations are shown for simplicity. The upper turntable 12 is rotated until the disk receiving station with a can end 16 is carried to inspection location 62 where inspection and control device 28 inspects the can end 16 to determine the angular orientation of the metal grain texture 18 (e.g. 18a or 18b). Because the disk receiving stations 20, 22, 24 and 26 are rigidly fixed to upper turntable 12, the direction of the metal grain texture of each of the individual can ends 16 remains fixed with respect to the upper turntable 12, while the angular orientation of each individual can end rotates with respect to the surrounding environment as the can ends are carried by the upper turntable. That is, as shown in FIG. 4 by the angle phi ($\phi$), the direction of orientation of the metal grain texture with respect to an imaginary line drawn tangent to the outer surface of the upper turntable remains constant. Thus, as the upper turntable 12 is rotated, the angular orientation of each can end 16 on upper turntable 12 is rotated with respect to the surrounding environment and output means 30.

In a preferred embodiment of the invention, the inspection and control device 28 is a scanner which electro-optically scans the can end 16 at inspection location 62 and determines the angular orientation of the metal grain texture 18. The inspection and control device 28 can include means to input a desired predetermined angular orientation to which each of the can ends 16 are to be commonly oriented. Such means could include a keyboard, optical card reader, punch tape reader or the like. Additionally, the inspection and control device 28 can include a programmable microprocessor or other means to utilize the determined angular orientation of each can end and the desired predetermined angular orientation to calculate an angle beta ($\beta$) through which the turntable must be rotated to orient the metal grain texture 18 of the can end 16 to the predetermined angular orientation.

For example, a can end 16 with a metal grain texture indicated by 18a is positioned at inspection location 62 and inspected by scanner 28. The angular orientation of the can end 16 with respect to a known reference direction is determined. For example, the angle phi ($\phi$) between the direction of the metal grain texture 18a and a line which is tangent to upper turntable 12 adjacent to location 62 is shown in FIG. 4. The angular orientation of can end 16 with reference to the direction of some other geometric line or plane could also be used, e.g., the angle between the direction of the metal grain texture 18a and a line drawn parallel to the direction of flow of the can ends on an output conveyer 30.

From the determined angular orientation, the inspection and control device 28 calculates an angle $\beta 1$ through which the upper turntable 12 must be rotated to provide the desired predetermined angular orientation 18c and to carry the can end 16 having metal grain texture 18a to exemplary transfer location 64. At transfer location 64, the rotated can end has a metal grain texture 18a extending in the same direction as the predetermined angular orientation 18c of a can end 16 on output means 30.

At transfer location 64, the inspection and control device 28 will operate the disk retention means 34 of the disk receiving station of the upper turntable having can end 16 which has been rotated to the predetermined angular orientation indicated by 18c, and the angularly oriented can end 16 will be permitted to fall onto the associated disk receiving station of the lower turntable 48.

Because the angular orientation of each of the individual can ends inspected at inspection location 62 may randomly vary (i.e., the angle phi ($\phi$) varies), the calculated position of the transfer location will accordingly vary with each can end. For example, FIG. 4 shows with phantom lines a can end 16 inspected at inspection location 62 having a metal grain texture indicated by 18b, which must be rotated through a different angle $\beta 2$ to provide the metal grain texture 18b of a can end 16 with the predetermined angular orientation indicated by 18c of a can end 16 on output means 30. At exemplary location 66 after the can end is carried through angle $\beta 2$, the disk retention means 34 carrying the can end with metal grain texture 18b is operated to transfer the can end to the associated disk receiving station of the lower turntable.

Although the scanner shown in FIGS. 1 and 2 may include means such as a microprocessor for determining the transfer location, e.g., 64 or 66, in an alternative embodiment, not shown, the scanner may be detachably connected to a digital computer which is programmable to determine the angle B for each can end through which the upper and lower turntables must be rotated to achieve a common angular orientation of disk-shaped objects and to control the extension and retraction of the plurality of disk retention means 34.

Referring to FIGS. 1-4, when disk retention means 34 of the upper turntable are retracted, gravitational force causes the can end 16 to fall to the lower turntable 48. The lower turntable 48 is engaged and rotated by a rotating device 32 such that upper and lower turntables 12 and 48 rotate at the same rotational speed and the disk receiving stations 40, 42, 44 and 46 are always directly underneath the disk receiving stations 20, 22, 24 and 26.

Figure 5:
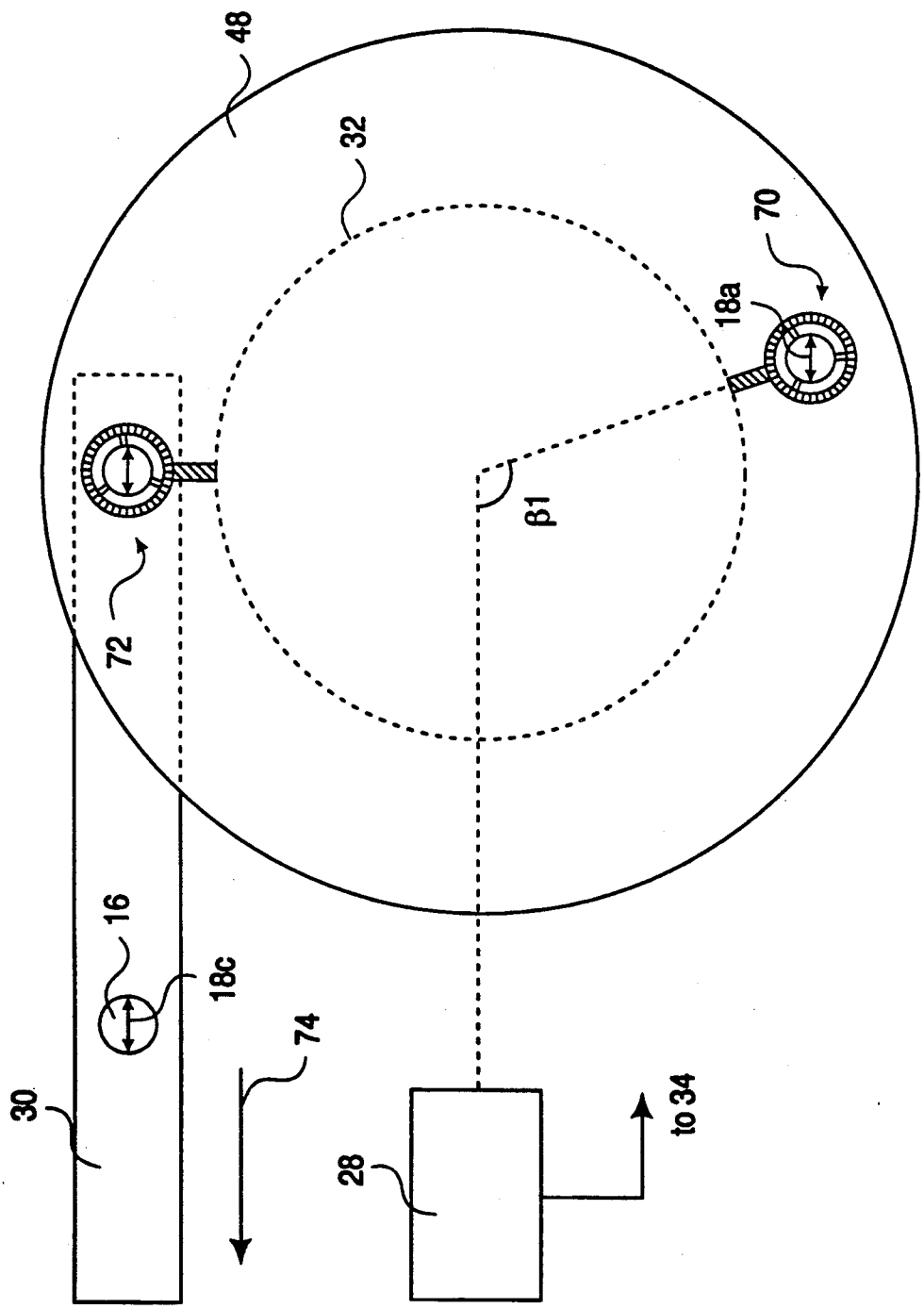
FIG. 5 is a top view of the apparatus with the upper turntable and supply means removed illustrating operation of the disk receiving stations on the lower turntable during the orientation method of this invention.

FIG. 5 illustrates an output location 72 and an exemplary transfer location 70 of the lower turntable which corresponds to the exemplary transfer location 64 of the upper turntable shown in FIG. 4. After the oriented can end 16 is transferred from upper turntable 12 to lower turntable 48 by operation of the disk retention means of the upper turntable at transfer location 64, the lower and upper turntables are simultaneously rotated from transfer location 70 to an output location 72 which is directly above a conveying means 30 for conveying each of the oriented can ends from the orientation apparatus 10. During the rotation of the lower turntable 48 from the transfer location 70 to output location 72, counter-rotational drive means 50, interconnected via means 52 to rotating means 12, maintains a constant angular orientation of each of the can ends 16 on the lower turntable; for example, the direction of the metal grain texture of the can ends does not change with respect to the direction of travel of an output means 30. Any suitable drive mechanism(s) known in the art may be utilized to rotate each of the disk receiving stations 40, 42, 44 and 46 in an angular direction opposite to that of the lower turntable 48 and at an angular speed such that each of the disk receiving stations 40, 42, 44 and 46 rotate exactly one counter-revolution for each revolution of the lower turntable 48. Such a drive mechanism may use any combination of gears or belts or other suitable non-slipping drive means.

As shown in FIG. 3, the angular orientation 18c of the can ends 16 on lower turntable 48 can be maintained the same as the angular orientation of can ends which are carried from the orientation apparatus 10 by output means 30. In the example shown in FIG. 5, the angular orientation 18a of the can end 16 on the lower turntable 48 has been carried to the same angular orientation 18c of the can ends 16 on output means 30. Any predetermined angular orientation of can ends may be achieved by the orientation apparatus 10 and method of this invention, as may be desirable depending on the manufacturing process(es) to be subsequently performed. Moreover, since counter-rotational drive means 50 operates to maintain a predetermined constant angular orientation of each of the can ends 16 on lower turntable 48, the exact position of output location 72 is not critical and can vary, i.e., an output location 72 positioned at a geometric location other than directly under stack loader 14.

The disk retention means 34 of the lower turntable at the output location 72 are operated and the can end is released to the output means 30. As shown in FIG. 5, the output means 30 conveys each of the can ends 16 away from the orientation device 10 with a predetermined angular orientation 18c towards down line manufacturing stations where further manufacturing operations can be performed. In a preferred embodiment, the output means 30 comprises a conveying means for conveying the oriented can ends from the orientation apparatus.

Figure 6:
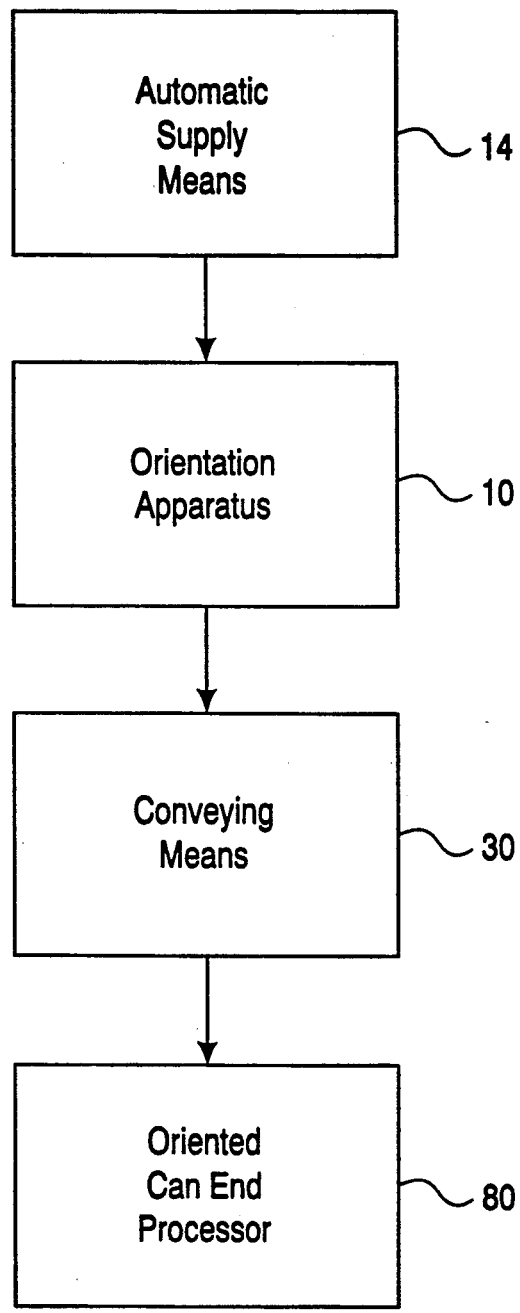
FIG. 6 is a diagrammatic illustration of the invention as part of an apparatus and method in the manufacture of can ends.

FIG. 6 illustrates a flow diagram for a system of my invention as applied to an apparatus and method for orienting can ends. An automatic supply means 14 can provide a flow of can ends to the system in a continuous or batch manner. The orientation apparatus 10 receives the can ends, provides a common angular orientation of the can ends at the output of the orientation apparatus 10, and delivers oriented can ends to a conveying means 30. The oriented can ends are maintained in an oriented position on the conveying means 30 and are conveyed to one or more oriented can end processors 80 which perform any of a number of additional manufacturing processes on the oriented can ends. An oriented can end processor 80 could, for example, provide a scored pour opening on each of the oriented can ends.

While the preceding description illustrates the presently known best mode for carrying out the invention, the scope of this invention is not limited, as will be apparent to those skilled in the art, to the described best mode and is limited only by the scope of the invention, following claims and the prior art.

I claim:

1. A disk orientation apparatus comprising:
   an upper turntable adapted to receive disk-shaped objects having a detectable angular orientation, said upper turntable including a plurality of disk receiving stations,
   a lower turntable adapted to separately receive each of said disk-shaped objects from said upper turntable, said lower turntable including an equal number of disk receiving stations as said upper turntable which are rotated with respect to a direction and speed of rotation of said lower turntable to maintain a constant angular orientation;
   a plurality of operable disk retention means positioned in the plurality of disk receiving stations, said operable disk retention means retaining said disk-shaped object in the disk receiving stations and allowing transfer of said disk-shaped objects from said plurality of disk receiving stations by gravitational force;
   means for rotating said lower turntable and said upper turntable; and
   an inspection and control device for determining the angular orientation of each of said disk-shaped objects, said inspection and control device controlling said operable disk retention means to transfer each of said disk-shaped objects from said upper turntable to said lower turntable at a predetermined angular orientation.

2. The apparatus of claim 1 wherein said inspection and control device further controls the rotational speed of the upper turntable and lower turntable.

3. The apparatus of claim 1 wherein said inspection and control device is adapted to detect at least one discernible feature on the surface of said disk-shaped object allowing the angular orientation to be determined therefrom.

4. The apparatus of claim 1 wherein said upper and lower turntables are dependently connected to said rotating means.

5. The apparatus of claim 1 wherein said operable disk retention means comprises a solenoid operated disk holder.

6. The apparatus of claim 1 wherein said operable disk retention means comprises a pneumatically operated disk holder.

7. The apparatus of claim 1 further comprising an automatic supply means for supplying a flow of said disk-shaped objects to said upper turntable.

8. The apparatus of claim 7 wherein said automatic supply means is a stack loader.

9. The apparatus of claim 7 wherein said automatic supply means is a conveyor.

10. The apparatus of claim 1 wherein said inspection and control device controls the plurality of disk retention means in said lower turntable to individually transfer each of said disk-shaped objects in said predetermined angular orientation from said lower turntable to an output means.

11. The apparatus of claim 10 wherein said output means is a conveyor.

12. The apparatus of claim 10 wherein said output means is a stacking device.

13. The apparatus of claim 11 wherein said conveyor receives said disk-shaped objects with a constant angular orientation relative to the direction of travel of said conveyor.

14. The apparatus of claim 1 wherein said inspection and control device comprises an electro-optical scanner.

15. The apparatus of claim 14 wherein said detectable angular orientation comprises a surface of said disk-shaped object having a metal grain texture indicative of metal grain direction.

16. The apparatus of claim 15 wherein said inspection and control device inspects said disk-shaped objects, determines the orientation of said metal grain texture of said disk-shaped object, and determines an angle through which said upper turntable is rotated to position the inspected disk-shaped object on said upper turntable at a predetermined angular orientation.

17. The apparatus of claim 16 wherein each of said disk-shaped objects are transferred from a disk receiving station of said upper turntable to a disk receiving station of said lower turntable by gravitational force upon release of said disk-shaped object by said operable disk retention means.

18. A can end orientation apparatus comprising:
   an upper turntable adapted to receive can ends having a detectable angular orientation, said upper turntable including a plurality of disk receiving stations;
   a lower turntable adapted to separately receive each of said disk-shaped objects from said upper turntable, said lower turntable including a plurality of disk receiving stations, said disk receiving stations being rotated with respect to said lower turntable to maintain a constant angular orientation;
   a plurality of operable disk retention means positioned in the plurality of said disk receiving stations, said operable disk retention means comprising a plurality of electrically operated disk holders permitting transfer of said can ends by gravitational force;
   means for rotating said lower turntable and said upper turntable; and
   an inspection and control device comprising an electro-optical scanner for scanning a detectable feature of each of said can ends and determining the angular orientation of each of the can ends therefrom, and means for operating each one of said plurality of disk retention means to transfer each of said can ends from said upper turntable to said lower turntable when said upper turntable has been rotated to position each of said can ends at a predetermined angular orientation and from said lower turntable to an output means at said predetermined angular orientation.

19. The apparatus of claim 18 wherein said detectable feature of said can ends comprises a scannable metal grain structure.

20. The apparatus of claim 18 wherein said operable disk retention means comprises a pneumatically operated disk holder.

21. A method of orienting disk-shaped objects comprising the repetitive steps of:
    supplying a disk-shaped object with a discernible angular orientation to an upper turntable;
    receiving a disk-shaped object at a disk receiving station located in said upper turntable;
    rotating said upper turntable so that said disk-shaped object is positioned adjacent to an inspection and control means;
    inspecting said disk-shaped object with said inspection and control means to determine the angular orientation of said disk-shaped object;
    determining an angle through which said upper turntable must be rotated to position the inspected disk-shaped object at a predetermined angular orientation;
    rotating said upper turntable until the disk-shaped object is at the predetermined angular orientation;
    transferring said disk-shaped object from said upper turntable to a lower turntable while maintaining the predetermined angular orientation; and
    rotating said lower turntable, while maintaining said disk-shaped object at the predetermined angular orientation during the rotation of said lower turntable, to an output location for removal of said angularly oriented disk-shaped object.

22. The method of claim 21 further including the step of transferring said disk-shaped object from said lower turntable to an output means at said output location.

23. The method of claim 22 wherein said output means is a conveying means which receives said disk-shaped object from said lower turntable at said predetermined angular orientation with respect to the direction of travel of said conveying means.

24. The method of claim 21 wherein said inspecting step comprises inspecting said disk-shaped object with an electro-optical scanner to determine the angular orientation of said disk-shaped object.

25. The method of claim 24 wherein said disk-shaped object is a can end.

26. The method of claim 25 wherein the angular orientation of the disk-shaped object is determined from a metal grain texture of said disk-shaped object.

27. A method of orienting disk-shaped objects comprising the steps of:
    delivering a flow of disk-shaped objects having an angular orientation which is discernable with an optical scanning means;
    placing each disk-shaped object on operable disk retention means carried by a turntable of an orientation apparatus;
    inspecting optically each disk-shaped object and determining its angular orientation and an angle of rotation to place it in a predetermined angular orientation;
    rotating the turntable and carrying each of said disk-shaped objects to change the angular orientation of each of said disk-shaped objects;
    operating said disk retention means for each of said disk-shaped objects when each disk-shaped object has been rotated to obtain the predetermined angular orientation; and
    transferring said oriented disk-shaped objects from said orientation apparatus to an output means.

28. The method of claim 27 wherein said disk-shaped object is a can end.

29. The method of claim 28 further comprising the step of performing at least one manufacturing operation on said oriented can end with at least one downstream can end processor.

30. The method of claim 29 wherein said at least one manufacturing operation comprises scoring each of said oriented can ends to provide a pour opening.

31. The method of claim 27 wherein said orientation apparatus comprises:
    an upper turntable adapted to receive disk-shaped objects having a detectable angular orientation, said upper turntable including a plurality of disk receiving stations;
    a lower turntable adapted to separately receive each of said disk-shaped objects from said upper turntable, said lower turntable including a plurality of disk receiving stations which are rotated with respect to a rotational direction of said lower turntable to maintain a constant angular orientation;
    a plurality of operable disk retention means in the plurality of said disk receiving stations, said operable retention means coacting with gravitational force to transfer said disk-shaped objects from said upper turntable or said lower turntable; and
    means for rotating said lower turntable and said upper turntable.

32. The method of claim 31 further including the steps of:
    determining an angle through which said upper turntable must be rotated to position the inspected disk-shaped object a said predetermined angular orientation;
    rotating said upper and lower turntables;
    transferring said disk-shaped object from said upper turntable to said lower turntable after it has been rotated to said predetermined angular orientation; and
    rotating said lower turntable, while maintaining said disk-shaped object at the predetermined angular orientation during the rotation of said lower turntable, to an output location for removal of said angularly oriented disk-shaped object.

* * * * *